United States Patent [19]

Decker et al.

[11] Patent Number: 4,802,648
[45] Date of Patent: Feb. 7, 1989

[54] ADJUSTABLE ENGINE MOUNT

[75] Inventors: Heinz Decker, Vaihingen; Ortwin Engfer, Stuttgart; Walter Kuhle, Neckarwestheim, all of Fed. Rep. of Germany

[73] Assignee: Robert Bosch GmbH, Stuttgart, Fed. Rep. of Germany

[21] Appl. No.: 153,380

[22] Filed: Feb. 8, 1988

[30] Foreign Application Priority Data

Feb. 21, 1987 [DE] Fed. Rep. of Germany ....... 3705579

[51] Int. Cl.[4] ............................................. F16M 13/00
[52] U.S. Cl. .................................... 248/550; 248/566; 248/638; 267/140.1
[58] Field of Search ............... 248/550, 562, 566, 636, 248/638, 659; 267/140.1, 152; 180/300, 312; 123/195 A, 192 R

[56] References Cited

U.S. PATENT DOCUMENTS

| 4,635,910 | 1/1987 | Ozawa | 267/140.1 |
| 4,638,983 | 1/1987 | Idigkeit | 248/550 |
| 4,648,576 | 3/1987 | Matsui | 248/550 |
| 4,700,933 | 10/1987 | Chikamori | 180/300 X |
| 4,706,945 | 11/1987 | Watanabe | 267/140.1 X |
| 4,709,779 | 12/1987 | Takehara | 180/300 |
| 4,720,087 | 1/1988 | Auclos | 267/140.1 |

FOREIGN PATENT DOCUMENTS 3441392  5/1986  Fed. Rep. of Germany .

Primary Examiner—J. Franklin Foss
Attorney, Agent, or Firm—Edwin E. Greigg

[57] ABSTRACT

An adjustable engine mount for shielding a vehicle body from oscillations of a drive unit, in which the magnitude of the damping and of the spring rate is controlled as a function of control signals of an electronic control unit. For adjusting the damping, the engine mount has an actuating device, by means of which the size of a throttle cross section between a first chamber and a second chamber of a damping chamber can be adjusted. For adjusting the spring rate, the engine mount has an air cushion which functions like a pneumatic spring element, which can be inflated and vented via a valve device. The electronic control unit has inputs for various input signals, which describe parameters that influence the motion of the drive unit relative to the vehicle body. The electronic control unit controls the damping and the spring rate of the engine mount as a function of the magnitude of at least one of the input signals.

12 Claims, 1 Drawing Sheet

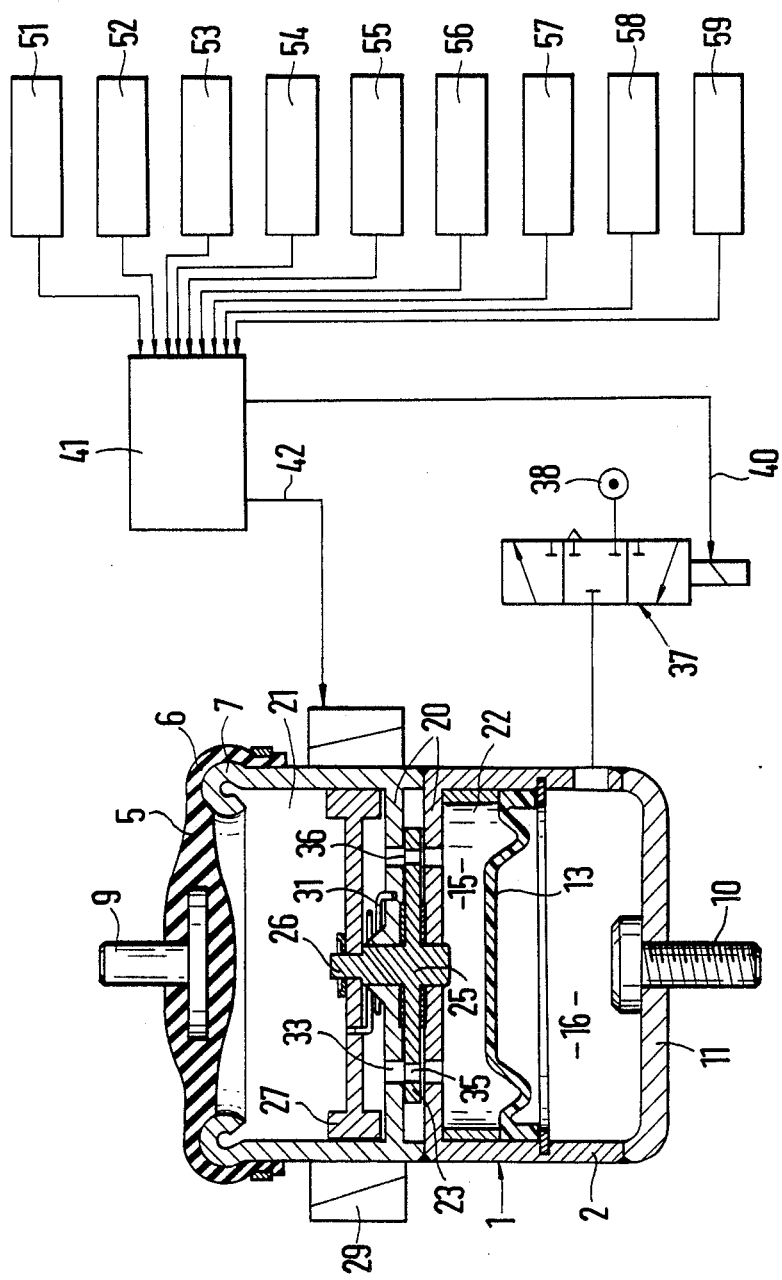

ADJUSTABLE ENGINE MOUNT

BACKGROUND OF THE INVENTION

The invention is based on an adjustable engine mount as defined hereinafter. An engine mount for supporting a drive motor, for example, on a motor vehicle frame is already known, the damping characteristic of which is variable during operation as well (German Offenlegungsschrift No. 34 41 592). While the support function and the resiliency of this engine mount is attained by means of a rubber element, the hydraulic damping action is turned on and off by subjecting the pressure chamber of the mount to either overpressure or negative pressure from an external air source or vacuum source. The alternation from the damped to undamped operating state and vice versa is performed automatically via an electronic control unit as a function of predetermined parameters.

Given the great number of factors that effect the motions of the engine mounted in the motor vehicle, however, a two-point control of this kind is capable of attaining persuasive suppression of engine vibrations only under certain operating conditions. In all other operating ranges, sacrifices in terms of the comfort of the ride must be expected, as a consequence of vibration of the drive unit that is transmitted to the vehicle frame.

OBJECT AND SUMMARY OF THE INVENTION

The engine mount according to the invention has the advantage over the prior art of virtually completely suppressing the transmission of drive unit vibration to the motor vehicle and hence improving the ride, particularly at low engine rpm and upon load changes. To this end, the engine mount makes it possible to control the damping characteristic individually in a manner adapted to prevailing operating conditions.

With the provisions of the invention as disclosed, advantageous further developments of an improvements to the engine mount defined by this disclosure are attainable. It is particularly advantageous to make the spring rate of the engine mount variable, so that especially during engaging and disengaging the clutch or upon load changes, the motion of the drive unit relative to the vehicle body can be kept at a low level.

The invention will be better understood and further objects and advantages thereof will become more apparent from the ensuing detailed description of a preferred embodiment taken in conjunction with the drawing.

BRIEF DESCRIPTION OF THE DRAWING

The sole FIGURE of the drawing illustrates the invention in simplified form with the engine mount shown in cross section.

DESCRIPTION OF THE PREFERRED EMBODIMENT

The engine mount 1 shown in the drawing has a cup-shaped, multiple-part housing 2, which toward its open end is closed off in a sealing manner by an elastic spring element 5. The elastic spring element 5 may for example be of rubber and with an outer portion 6 it encompasses a flanged-over edge 7 of the housing 2. Preferably the elastic spring element 5 is embodied such that it acts resiliently in the axial direction, with response to the housing 2, while radial motions of the elastic spring element 5 are either practically impossible or are only very slightly possible. A first fastener 9 is embedded coaxially in the elastic spring element, while a second fastener 10 is located coaxially in the bottom 11 of the housing 2. The first fastener 9 and the second fastener 10 are each secured to parts that normally abut one another, such as the drive motor and the vehicle chassis.

An elastic diaphragm 13 divides the interior of the housing 2 into a damping chamber 15, which is filled with a damping medium, and an air cushion 16. The air cushion 16 is defined by the bottom 11 of the housing 2 on the one end and by the elastic diaphragm 13 on the other. The damping chamber 15 extends between the elastic diaphragm 13 and the elastic spring element 5. A dual partition 20 divides the damping chamber 15 into a first chamber 21, which comprises one wall 20 and the elastic spring element 5, and a second chamber 22, disposed between the second wall 20 and the elastic diaphragm 13. A rotary slide valve 23 embodied as a perforated round disc is arranged to be disposed between the parallel walls of the partition 20. In the exemplary embodiment shown which comprises a two-ply partition; the rotary slide valve 23 is rotatably supported in the dual partition 20 via a coaxial shaft 25. The axial play between the flat sides of the rotary slide valve 23 and the dual partition 20 should be as little as possible. In the direction toward the elastic spring element 5, the shaft 25 terminates in the form of a journal 26, on which a rotary armature 27 which extends parallel to the rotary slide valve 23 is fixed. The rotary armature 27 comprises ferromagnetic material and is rotatable in response to the force of a magnetic field. The magnetic field is built up by an electromagnetic actuating device 29 that is merely suggested in the drawing and which is located outside the housing 2, is arranged to encompass the rotary armature 27, and for example takes the form of a coil winding. The magnetic force exerted by the electromagnetic actuating device 29 upon the rotary armature 27 is effected through the thin-walled housing 2, counter to the restoring force of a torsion spring 31, which at one end engages the rotary armature and at the other end engages an upper wall of the partition 20.

Axially extending perforations 33 are located in the dual partition 20, and throttle openings 35 that likewise extend axially are located in the rotary slide valve 23. Depending on the position of the rotary slide valve 23 relative to the partition 20, the openings 33 and the throttle openings 35 overlap one another to a variable extent, thus forming throttle cross sections 36 for the damping medium. The openings 33 and the throttle openings 35 are oriented toward one another such that at either maximum or minimum deflection of the rotary slide valve 23, the openings 33 and the throttle openings 35 coincide completely, thus permitting unrestricted flow between the first chamber 21 and the second chamber 22 of the damping chamber 15. In this position, the throttling action of the throttle device, which is thus composed of the partitions 20 and the rotary slide valve 23, is at a minimum. If the rotary slide valve 23 is deflected such that the openings 33 and the throttle openings 35 overlap only partially, then the throttling action increases proportionately. By suitable positioning of the rotary slide valve 23, the throttling action is thus infinitely variable. The actuation of the rotary slide valve 23 is effected via the rotary armature 27 that is firmly connected to the rotary slide valve 23 via the shaft 25 and the journal 26. When tension or compression is exerted upon the engine mount 1, an exchange of damping medium therefore takes place between the first chamber 21 and the second chamber 22 via the openings 33 and the throttle openings 35. The total volume of the damping medium located in the chambers 21, 22 is virtually constant, because of its incompressibility. The situation is different for the air cushion 16; because of the relatively high compressibility of air, the air cushion acts like a pneumatic shock absorber. The elastic element 5 and the air cushion 16 thus embody two series-connected spring-like elements which communicate with one another through the damping chamber 15.

The spring stiffness or spring rate of the engine mount 1 can be adjusted by corresponding variation of the quantity of air in the air cushion 16. To this end, the air cushion can be made to communicate, via a valve device 37 in its first position, with a compressed air source 38, while in two other positions of the valve device 37 the air cushion 16 is vented to the atmosphere or sealed off from the outside, respectively.

The valve device 37 is embodied for example as an electromagnetically actuatable variable-position valve and is connected via an electrical connection line 40 to an electronic control unit 41. The electromagnetic actuating device 29 for the rotary slide valve 23 is likewise connected to the electronic control unit 41 via a connection line 42.

Both the magnitude of the damping and the magnitude of the spring characteristic of the engine mount 1 are thus a function of control signals of the electronic control unit 41. The electronic control unit 41 has inputs for a plurality of input signals 51-59, which are generated by measurement pickups or other signal transducers, not shown in the drawing, and which describe various parameters that affect the motion of the drive unit. The data content of the various input signals 51-59 will now be described as follows:

The input signal 51 is a measure of the engine motion relative to the vehicle body. This signal is preferably generated by a travel transducer that detects the relative deflection of the drive unit with respect to the vehicle body.

The input signal 52 describes the angle of the throttle valve. When the engine rpm is known, the throttle valve angle allows conclusions to be drawn as to the magnitude of the engine power and engine torque. The engine torque directly influences the motion of the drive unit relative to the vehicle body.

The third input signal 53 is a measure of the adjustment speed of the throttle valve. It is generated for instance by a transducer that detects the angular velocity of the throttle valve shaft. The third input signal 53 is thus well-suited for transmitting load changes of the drive unit to the electronic control unit 41 before they cause a load change motion of the drive unit relative to the vehicle body.

The fourth input signal 54 describes the position of the gas pedal. This input signal is proportional to the input signal 52 and can be used as an alternative.

The fifth input signal 55 describes the disconnection position of the coupling, since during coupling and uncoupling a sudden change in drive moment takes place, causing a forceful relative motion between the drive unit and the vehicle body.

The sixth input signal 56 describes the engine rpm. The engine rpm also influences the forces which act upon the engine mount; for example, the effect of load changes is much less at high engine rpm than at low engine rpm.

Via the seventh input signal 57, the electronic control unit 41 is informed of the gear selected at that time. This information is also important for correct setting of the characteristics of the engine mount 1, since load changes in a low gear, for instance, produce a more forceful motion of the drive unit than in higher gears.

The input signal 58 describes the speed of the vehicle, and the input signal 59 describes the absolute acceleration of the vehicle body. These two input signals are of only secondary importance, but in certain cases they, too, can provide information about the forces acting upon the engine mount 1.

Processing of the input signals 51-59 into control signals acting upon the electromagnetic actuating device 29 and the valve device 37 can for example be performed by a microprocessor integrated with the electronic control unit 41. The evaluation of the input signals 51-59 can also be performed in the form of performance graphs.

The list of input signals 51-59 described herein can be made even broader for additional parameters can also be included. Nor need all the input signals be used in combination for evaluation purposes; control of the engine mount 1 is possible if even only a few, albeit highly informative, input signals are processed by the electronic control unit 41. The input signal 51, which directly describes the motion of the drive unit relative to the vehicle body, has a particularly high informational value, for instance. In the electronic control unit 41, it can be determined that the degree of damping by the engine mount is increasing with increasing acceleration of the drive unit relative to the vehicle body. If the acceleration of the drive unit relative to the vehicle body is directed such that the pressure upon the engine mount 1 is increasing, then the air cushion 16 can also be vented via the valve device 37, which increases the spring rate directly, thus leading to the interception of the motion of the drive unit.

The third input signal 53 and the sixth input signal 56, which describe the adjusting velocity of the throttle valve and the engine rpm, respectively, are also highly informative. The input signal 53 reaches the electronic control unit 41 even before the engine motion begins, and thus enables an anticipatory control of the damping and shock absorption of the engine mount 1.

The engine mount shown and described herein is naturally understood to be only one of many possible variants. A great number of combinations of rubber springs, steel springs, magnet springs, pneumatic springs, hydraulic dampers, and friction dampers are possible, connected either in series or in parallel. Nor is the manner in which the damping and spring rate of the engine mount is adjusted limited to the electromagnetic actuation shown. Hydraulic or pneumatic actuation, for instance, is also possible.

It is not necessary in all applications to control both the damping and the spring rate of the engine mount at once. In many cases, control of the damping is sufficient. An additional regulation of the air pressure in the air cushion 16 via the valve device 37 should be performed whenever very stringent suppression of engine vibrations is required.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An adjustable engine mount for supporting a drive unit relative to a vehicle body, said adjustable engine mount including a damping chamber (15) which is divided into two chambers by a perforated partition and further including an elastic spring element, an air cushion (16) disposed in said adjustable engine mount in series with or parallel to said damping chamber (15), a valve device (37) in communication with said air cushion for pressurizing or depressurizing said air cushion, means adapted to connect said engine mount to an electronic control unit whereby magnitude of the damping of said engine mount can be varied as a function of control signals of said control unit, wherein the electronic control unit (41) has an input which communicates with the output of a measurement pickup via which the magnitude of the engine motion is detected, and further that the electronic control unit (41) has an output for control signals that are arranged to communicate with the input of an actuating device (29), said actuating device adapted to define communication between said two chambers (21, 22), and said valve device (37) includes an electronic control input that communicates with an output of said electronic control unit (41).

2. An adjustable engine mount as defined by claim 1, in which said adjustable engine mount comprises a common housing which contains said two chambers which communicate with each other, and a flexible diaphragm which separates one of said two chambers from said air cushion.

3. An adjustable engine mount as defined by claim 1, in which the electronic control unit (41) has additional outputs which communicate with outputs of further measurement pickups, via which at least one of the following variables is detected:
throttle valve angle
gas pedal deflection
disconnection position of the coupling
gear engaged
vehicle speed
absolute acceleration of the vehicle body.

4. An adjustable engine mount as defined by claim 3, in which said adjustable engine mount comprises a common housing which contains said two chambers which communicate with each other, and a flexible diaphragm which separates one of said two chambers from said air cushion.

5. An adjustable engine mount for supporting a drive unit relative to a vehicle body, said adjustable engine mount including a damping chamber (15) which is divided into two chambers by a perforated partition and further including an elastic spring element, an air cushion (16) disposed in said adjustable engine mount in series with or parallel to said damping chamber (15), a valve device (37) in communication with said air cushion for pressurizing or depressurizing said air cushion, means adapted to connect said engine mount to an electronic control unit whereby magnitude of the damping of said engine mount can be varied as a function of control signals of said control unit, wherein the electronic control unit (41) has an input which communicates with the output of a measurement pickup via which the magnitude of the adjusting speed of a throttle valve is detected, and further that the electronic control unit (41) has an output for control signals that are arranged to communicate with the input of an actuating device (29), said actuating device adapted to define communication between said two chambers (21, 22), and said valve device (37) includes an electronic control input that communicates with an output of said electronic control unit (41).

6. An adjustable engine mount as defined by claim 5, in which said adjustable engine mount comprises a common housing which contains said two chambers which communicate with each other, and a flexible diaphragm which separates one of said two chambers from said air cushion.

7. An adjustable engine mount as defined by claim 5, in which the electronic control unit (41) has additional outputs which communicate with outputs of further measurement pickups, via which at least one of the following variables is detected:
throttle valve angle
gas pedal deflection
disconnection position of the coupling
gear engaged
vehicle speed
absolute acceleration of the vehicle body.

8. An adjustable engine mount as defined by claim 7, in which said adjustable engine mount comprises a common housing which contains said two chambers which communicate with each other, and a flexible diaphragm which separates one of said two chambers from said air cushion.

9. An adjustable engine mount for supporting a drive unit relative to a vehicle body, said adjustable engine mount including a damping chamber (15) which is divided into two chambers by a perforated partition and further including an elastic spring element, an air cushion (16) disposed in said adjustable engine mount in series with or parallel to said damping chamber (15), a valve device (37) in communication with said air cushion for pressurizing or depressurizing said air cushion, means adapted to connect said engine mount to an electronic control unit whereby magnitude of the damping of said engine mount can be varied as a function of control signals of said control unit, wherein the electronic control unit (41) has an input which communicates with the output of a measurement pickup via which the magnitude of the engine rpm is detected, and further that the electronic control unit (41) has an output for control signals that are arranged to communicate with the input of an actuating device (29), said actuating device adapted to define communication between said two chambers (21, 22), and said valve device (37) includes an electronic control input that communicates with an output of said electronic control unit (41).

10. An adjustable engine mount as defined by claim 4, in which the electronic control unit (41) has additional outputs which communicate with outputs of further measurement pickups, via which at least one of the following variables is detected:
throttle valve angle
gas pedal deflection
disconnection position of the coupling
gear engaged
vehicle speed
absolute acceleration of the vehicle body.

11. An adjustable engine mount as defined by claim 10, in which said adjustable engine mount comprises a common housing which contains said two chambers which communicate with each other, and a flexible diaphragm which separates one of said two chambers from said air cushion.

12. An adjustable engine mount as defined by claim 9, in which said adjustable engine mount comprises a common housing which contains said two chambers which communicate with each other, and a flexible diaphragm which separates one of said two chambers from said air cushion.

* * * * *